I. D. LENGEL AND S. S. SHEARS.
VEHICLE SPRING.
APPLICATION FILED DEC. 4, 1916.
1,336,468.  Patented Apr. 13, 1920.
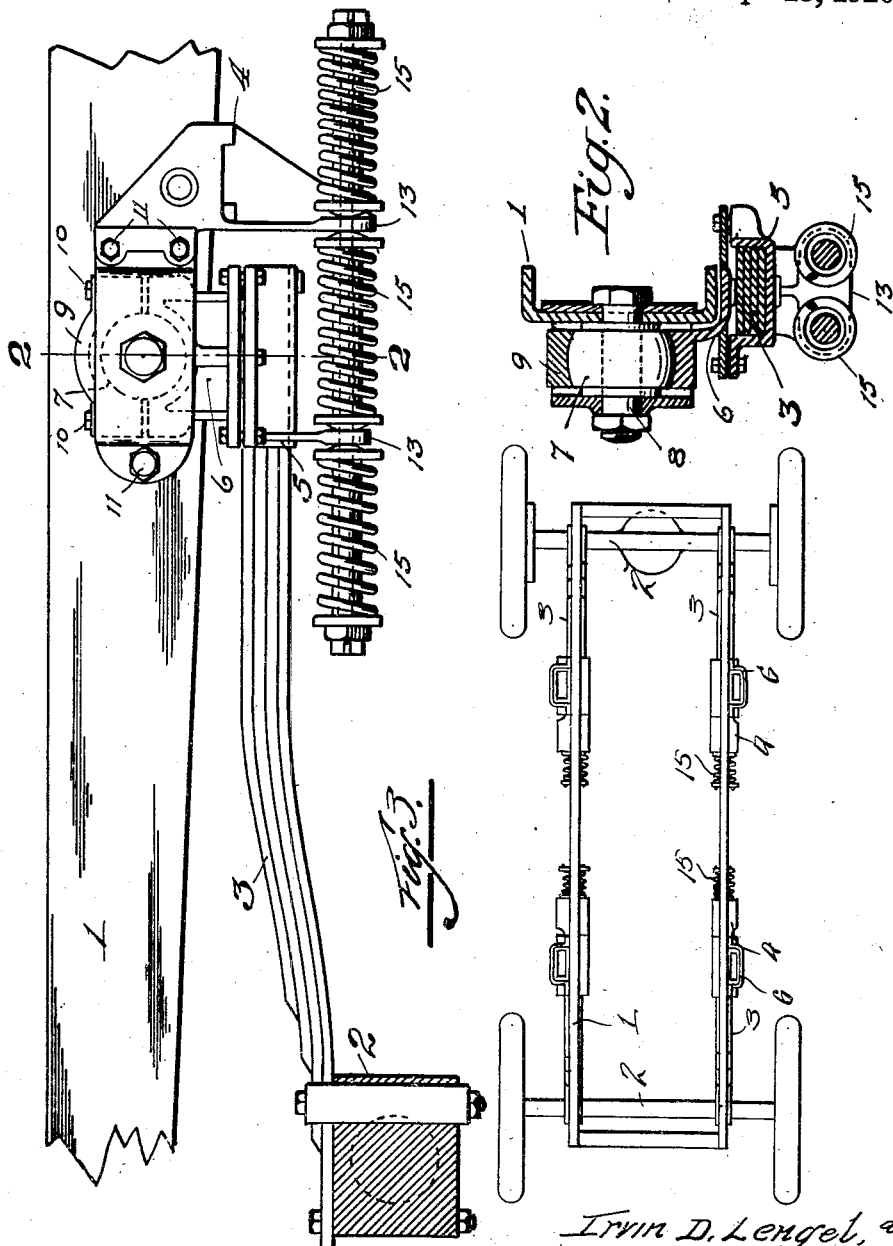
Irvin D. Lengel, and
Sumner S. Shears,
Inventors

UNITED STATES PATENT OFFICE.

IRVIN D. LENGEL AND SUMNER S. SHEARS, OF READING, PENNSYLVANIA; SAID LENGEL ASSIGNOR TO SAID SHEARS.

VEHICLE-SPRING.

1,336,468.   Specification of Letters Patent.   Patented Apr. 13, 1920.

Application filed December 4, 1916. Serial No. 134,881.

*To all whom it may concern:*

Be it known that we, IRVIN D. LENGEL and SUMNER S. SHEARS, citizens of the United States, residing at Reading, in the county of Berks and State of Pennsylvania, have invented certain new and useful Improvements in Vehicle - Springs, of which the following is a specification.

This invention relates to improvements in vehicle springs and it is intended more particularly for use in connection with motor driven vehicles.

The object in the present instance is to so mount the spring, between the frame and the axles of such vehicle, that in addition to the usual function performed by the springs, provision will be made for overcoming all vehicular strain.

The invention comprises broadly a set of levers attached at one end to the axles and at the other end to the vehicle, and this connection to the vehicle is such that any strain, in whatsoever direction, is prevented, by means of what might properly be termed a universal connection as between the inner end of each of said levers and the vehicle frame.

By means of this connection, even such irregular or unusual twists or movements as are sometimes indulged in by a vehicle such as described, in traversing uneven surfaces or making sudden turns, are contemplated, and any strain that would otherwise be placed on the frame or axles is prevented, for the reason that this universal connection will permit the relative parts to so adjust themselves that all hurtful strain is overcome.

The invention is more fully described in the following specification and clearly illustrated in the accompanying drawing, in which:—

Figure 1 is a side elevational view of a portion of a vehicle frame, showing the application thereto of our device.

Fig. 2 is a sectional view taken through Fig. 1 on line 2—2.

Fig. 3 is a plan view, in reduced, diagrammatic form, showing the relative positions of the axles, levers and brackets.

The numeral 1 designates the end of a vehicle frame of ordinary construction, and 2 the forward axle of the vehicle. The numeral 3 designates a lever, preferably made in laminated form, the forward end of which is rigidly attached to the axle. The numeral 4 designates a bracket, attached to and depending from the frame 1. The numeral 5 designates a bracket attached to and depending from the inner or rear end of the laminated lever 3. This latter bracket 5 carries and acts as a support for a socket or bearing member 6 which is in turn adapted to accommodate and act in conjunction with a spherical bearing member 7, attached to the frame by means of a centrally disposed pivot 8 and the numeral 9 designates a cap member for the ball bearing which is attached to the lower or socket member by means of a set of screws or bolts 10.

A suitable bracket for supporting the outer end of the pivot 8 is provided, and its ends are secured by bolts 11 to the side of the frame 1.

From the under side of the brackets 4 and 5 we form depending projections 13 and a duplicate set of coiled springs 15, one set on either side of the vertical center of the depending projections 13, are arranged in horizontal alinement and adapted to be compressed in either direction, by the movement of the axle when said axle is moved vertically.

When the movement is other than in a vertical direction, or when it is caused by other than end thrust, that is to say when the movement is such that torsional strain would be effected on the frame or axles, the strain is relieved by the free movement of the universal joint comprising the spherical bearing member 7 and the socket member 6, which will permit of considerable torsional or twisting movement.

It will be noted that the lever 3 being solidly attached to the axle at its forward end and carrying the spring engaging member at its inner end, will take care of all ordinary concussions such as are ordinarily provided against by springs and shock absorbers, and that the universal joint connection between these inner ends of the levers and the vehicle frame, will take care of all torsional strains, so that the combined effect will be to ease the vehicle from strain and shock from whatever cause or direction.

Having thus fully described our invention, what we claim and desire to secure by Letters Patent is:—

1. In vehicle springs, the combination with a vehicle frame, of axles, levers rigidly secured to the axles at one end and pivotally attached to the frame at the other end, said pivotal connection comprising a universal joint, and horizontally disposed coil springs controlling the swing of the lever.

2. In vehicle springs, the combination with a vehicle frame and axles, of a pair of laminated levers secured to the axles at their outer ends and pivotally connected to the frame at their inner ends, each connection comprising a universal joint, one member of which is carried by the lever and the other by the frame, brackets depending from the frame, brackets depending from the levers, and horizontally disposed springs between the brackets.

3. In vehicle frames, the combination with a frame, and axles, of a pair of levers rigidly connected to each of the axles, and having pivotal connection with the frame at their inner ends, said pivotal connection comprising a ball and socket joint, one member of which is carried by the frame and the other by the lever.

4. The combination of a vehicle frame and axles, said vehicle frame being provided with one member of a ball and socket joint, with a laminated lever, rigidly secured to an axle on one end and having at its opposite end the other co-acting member of the ball and socket joint.

5. In vehicle springs, the combination with a vehicle frame and axles, of levers carried at the ends of the frame, the ends of the said levers being rigidly secured to the axles, brackets depending from the frame, brackets depending from the inner ends of the levers, horizontally acting coil springs between the lever brackets and the frame brackets, and means for adjusting the tension of the springs.

6. In a structure such as described, the combination with a vehicle frame and axles, of laminated levers pivoted to the frame at their inner ends and rigidly secured to the axles at their outer ends, brackets depending from the frame, brackets depending from the inner ends of the levers, horizontally applied coil springs between the brackets and horizontally applied coil springs on the outer sides of the brackets.

7. In a vehicle spring, the combination with a vehicle body, of levers carrying the axles at their outer ends, brackets at each corner of the vehicle body and having depending arms, a ball for each bracket, a socket member at the inner end of each lever and adapted to envelop the ball, an arm depending from the socket member, and controlling springs operated on by the arms of the brackets and the arms of the socket members.

8. In vehicle springs, the combination with a vehicle body, of a bracket at each corner of the same, a ball for each bracket, a bolt passing through the bracket and the ball, a socket member enveloping the ball, a lever extending from the socket member, and adapted to carry the axle and support the vehicle body, arms depending from the bracket and socket member, rods passing through the arms, springs on the rods between the arms, springs on the outer ends of the rods, and nuts outside of the springs.

In testimony whereof we affix our signatures.

IRVIN D. LENGEL.
SUMNER S. SHEARS.